United States Patent [19]
Wild

[11] Patent Number: 5,423,563
[45] Date of Patent: Jun. 13, 1995

[54] WHEELCHAIR HAVING APPARATUS FOR CLIMBING STAIRS

[76] Inventor: Franklin J. Wild, 63432 Ridge Ave., Lawrence, Mich. 49065

[21] Appl. No.: 266,430

[22] Filed: Jun. 27, 1994

[51] Int. Cl.$^6$ .............................................. B62D 1/14
[52] U.S. Cl. ................. 280/250.1; 280/5.22; 280/DIG. 10
[58] Field of Search ................. 280/250.1, 304.1, 5.22, 280/5.26, 5.3, 5.2, DIG. 10; 297/DIG. 4

[56] References Cited

U.S. PATENT DOCUMENTS

| | | | |
|---|---|---|---|
| 3,231,290 | 1/1966 | Weyer | 280/5.22 |
| 3,241,848 | 3/1966 | Flory | 280/5.26 |
| 4,061,129 | 12/1977 | Last | 280/5.26 X |
| 4,200,161 | 4/1980 | Pennington, Jr. | 280/5.26 X |
| 4,512,588 | 4/1985 | Cox | 280/5.26 |
| 5,158,309 | 10/1992 | Quigg | 280/5.22 |
| 5,308,098 | 5/1994 | Shea | 280/5.22 X |

FOREIGN PATENT DOCUMENTS

2657605  7/1977  Germany ......................... 280/5.22

Primary Examiner—Brian L. Johnson
Assistant Examiner—Kevin Hurley
Attorney, Agent, or Firm—Gordon W. Hueschen

[57] ABSTRACT

A wheelchair having apparatus mounted thereon which, when placed in stair-climbing position, enables an occupant of the wheelchair to turn the large wheels of the wheelchair in a reverse direction, thereby causing a plurality of sprockets and chains mounted thereon to climb a stairway. The occupant places the apparatus in stair-climbing position by utilizing a hand air or other fluid pump mounted on the frame of the wheelchair to pump fluid into actuating fluid cylinders, thereby causing the pistons and associated piston rods of the fluid cylinders to extend and to place the apparatus in the climbing position. In this position the occupant may also cause the wheelchair to descend a stairway. By reversing a valve, the occupant may pump fluid into the cylinders to place the climbing apparatus in the stowed-away position, in which position the wheelchair may be used as a normal wheelchair.

13 Claims, 7 Drawing Sheets

WHEELCHAIR HAVING APPARATUS FOR CLIMBING STAIRS

BACKGROUND OF THE INVENTION

1. Field of Invention

The present invention relates to wheelchairs, and is more particularly concerned with a wheelchair having apparatus affixed thereto for enabling the wheelchair to ascend and descend stairways.

2. Prior Art

Many forms of inventions have been disclosed in the Prior Art for enabling a wheelchair to climb stairs or other objects.

Brown et al., U.S. Pat. No. 3,283,839, shows an arrangement for a stair-climbing wheelchair utilizing two driven spiders having three wheels driven by a chain. However, there is no belt over the three wheels. Also, the lower spider containing a plurality of wheels is not driven but only dragged along. Further, there is no means shown for driving the arrangement. Certainly, there is no apparatus shown for permitting the occupant to direct and propel the apparatus himself. Winsor, U.S. Pat. No. 4,044,850, shows only a straight tractor tread for driving the wheelchair. An electric motor is shown to be the sole driving force. Rasmussen, U.S. Pat. No. 4,154,315, shows a spider having five wheels with a belt driving the wheels by means of a motor. Bihler et al., U.S. Pat. No. 4,556,229, shows an independent support for a wheelchair with the belt driven by an electric motor. Auer, U.S. Pat. No. 4,627,508, also shows a separate belt-driven vehicle utilizing an electric motor. Hester, U.S. Pat. No. 4,645,222, shows a wheelchair having a plurality of spiders with wheels, but driven by an electric motor. Livingston, U.S. Pat. No. 4,960,180, shows a separate cart using an endless track, to which the wheelchair is clamped. The device may be motor-driven or hand-operated by an attendant. Misawa, U.S. Pat. No. 5,197,558, teaches a motor-driven wheelchair carrier to which a wheelchair may be clamped. Finally Lepek, U.S. Pat. No. 5,273,296, shows a vehicle utilizing a plurality of spiders and wheels for overcoming rough terrain. A wheelchair is mentioned among the vehicles which may be utilized.

It is clear that none of the references shows a wheelchair capable of ascending and descending stairways, in which the sole motive power for engaging the stair-climbing apparatus, and for ascending and descending, is provided by the muscular power of the occupant of the wheelchair.

OBJECTS

It is an object of the present invention to provide a wheelchair which can be used as an ordinary wheelchair, but which can be placed in condition for climbing or for ascending or descending stairways.

It is a further object of the invention to provide a wheelchair of the type described, whereby the occupant of the wheelchair can cause the wheelchair to climb stairs utilizing only the physical strength of the occupant.

It is still another object to provide a wheelchair of the type described whereby the wheelchair may ascend and descend stairways without the necessity for motors or external power sources.

It is an additional object to provide a wheelchair having means to ascend and descend stairways which is relatively simple and inexpensive to build.

The foregoing and other objects, advantages, and characterizing features of the invention will become apparent from the following description of certain illustrative embodiments thereof considered together with the accompanying drawings, wherein like reference numerals signify like elements throughout the various figures.

SUMMARY OF THE INVENTION

What I believe to be my invention, then, comprises the following, inter alia, or in combination:

A wheelchair having apparatus affixed thereto for enabling said wheelchair to climb or descend a stairway solely under the guidance of and by means of the muscular power of an occupant, said wheelchair comprising:

a wheelchair frame having large wheels rotatably mounted thereon, a hand rail mounted on each large wheel, and small wheels rotatably mounted in fork means which are mounted on said frame and rotatable about a vertical axis, said apparatus comprising on each side of said frame:

a rear spider having a plurality of arms and a sprocket rotatably mounted on each arm, said spider being rotatably mounted on a rear portion of said frame, a guide arm pivotally mounted near a first end thereof on said wheelchair frame, a front spider rotatably mounted at the second end of said guide arm, said spider having a plurality of arms and a sprocket rotatably mounted at the end of each arm, a chain mounted over the sprockets of said front and rear spiders, means pivotally connected at one end to said frame and pivotally connected at the other end to said guide arm for extending said guide arm to a position wherein said front spider and its associated sprockets are moved to a climbing position, and alternatively for retracting said guide arm to a position wherein said front spider and its associated sprockets are in a stowed-away position, and a drive sprocket, mounted coaxially with and in fixed relationship to said large wheel, and adapted to engage said chain when said front spider and its associated sprockets are in a climbing position, and to become disengaged from said chain when said front spider and its associated sprockets are in a stowed-away position, whereby, when said front spider and its associated sprockets are in climbing position, said drive sprocket engages said chain and, when an occupant rotates said large wheels in a reverse direction, said wheelchair is caused to climb a stairway positioned at the rear thereof, such a wheelchair, wherein each of said spiders has three arms and a sprocket mounted at the end of each arm, such a wheelchair, wherein said means for extending or retracting said guide arm is a fluid-operated cylinder having a piston and piston rod adapted alternatively to extend and to retract, the proximal end of said cylinder being pivotally mounted on the frame of said wheelchair, and the distal end of said piston rod being pivotally connected to said guide arm, said cylinder having both proximal and distal fluid ports, a hand-operated fluid pump mounted on said wheelchair frame, and fluid hoses connecting said pump to said proximal and distal fluid ports for causing said piston alternatively to extend and to retract, such a wheelchair having a switching valve mounted on the said frame adapted for alternatively directing fluid into the proximal ports of said cylinders for extending said pistons, or directing fluid to the distal ports of said cylinders for retracting said pistons, such a wheelchair wherein said means for mounting said drive sprocket in fixed relationship with said large wheel is a collar affixed to said sprocket, said collar having notches provided at a free edge thereof defining a plurality of segments, said large wheel having a hub comprising a circular collar with radial ribs, the collar of said drive sprocket being positioned within the collar of said hub with said radial ribs being positioned in the notches of the collar of said drive sprocket, and the circular collar of the hub of said large wheel being affixed to the segments of the collar of said drive sprocket, such a wheelchair wherein the circular collar of the hub of said large wheel is affixed to the segments of the collar of said drive sprocket by means of pop rivets extending through apertures provided in said segments, such a wheelchair wherein said guide member has a slot provided therein and is pivoted to said frame by a pivot mounted in said slot for providing lost motion, such a wheelchair wherein said guide member is provided at one end with a recess, and a lock pin is provided on the frame of said wheelchair, whereby when said guide arm is moved to the stair climbing position, said recess engages and is locked to said lock pin, such a wheelchair wherein said chain has pads mounted on the outer surfaces of chain links thereof to provide increased friction and minimize damage to the stairway, such a wheelchair wherein extension of said guide arm to a position, wherein said front spider and its associated sprockets are in a climbing position, automatically places the rear spider and its associated sprockets into a climbing position, such a wheelchair wherein at an intermediate position the front spiders and their sprockets are lowered so that the drive chain is in contact with a floor therebeneath, thereby serving as a braking force, and finally such a wheelchair wherein the fluid-operated cylinder is an air cylinder.

DESCRIPTION OF THE PREFERRED EMBODIMENTS

Figure 1:
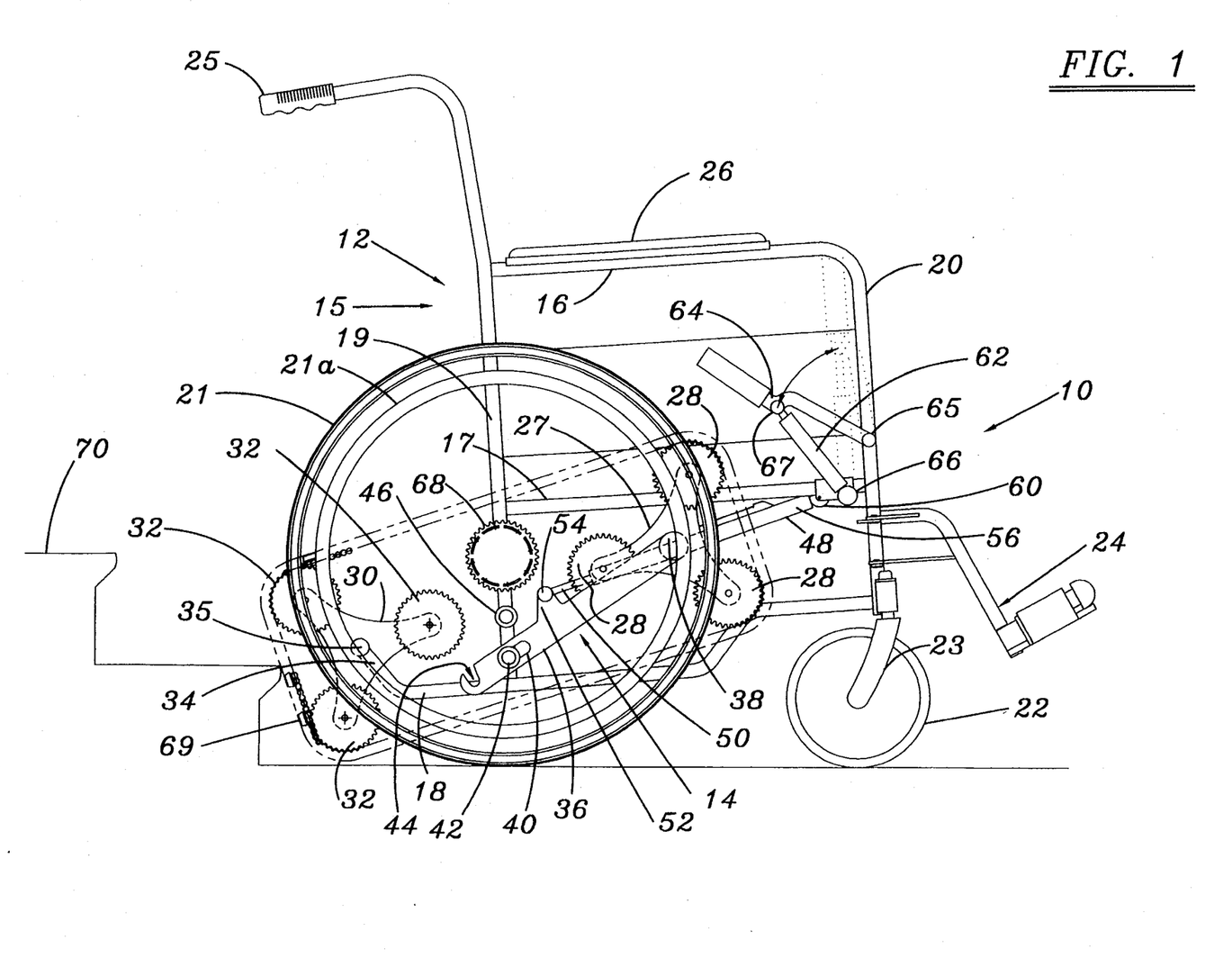
FIG. 1 is a right side elevational view of the wheelchair of the present invention, with the climbing apparatus in stowed-away position.
Figure 2:
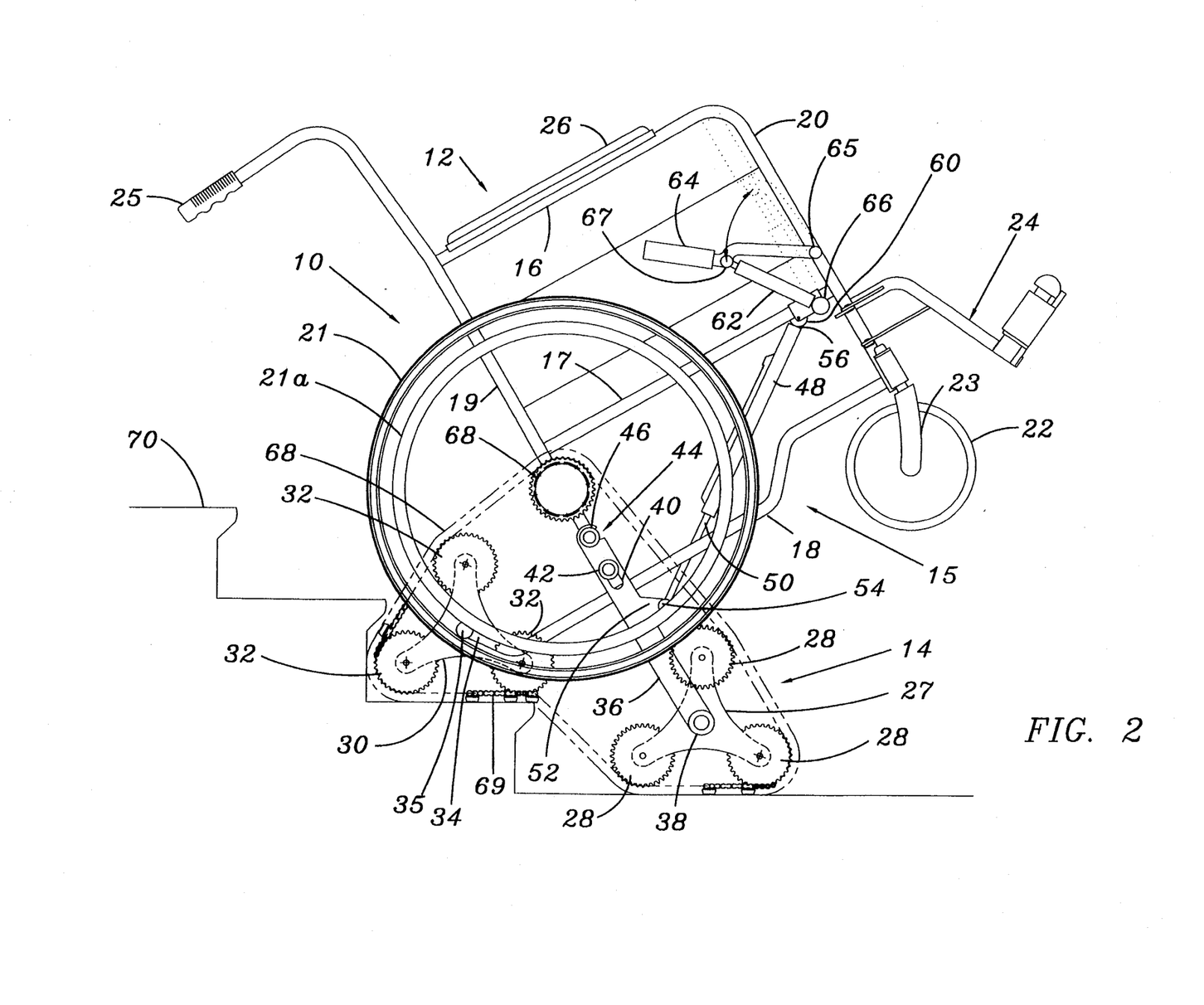
FIG. 2 is a right side elevational view of the wheelchair shown in FIG. 1, with the climbing apparatus in the climbing or descending position.
Figure 3:
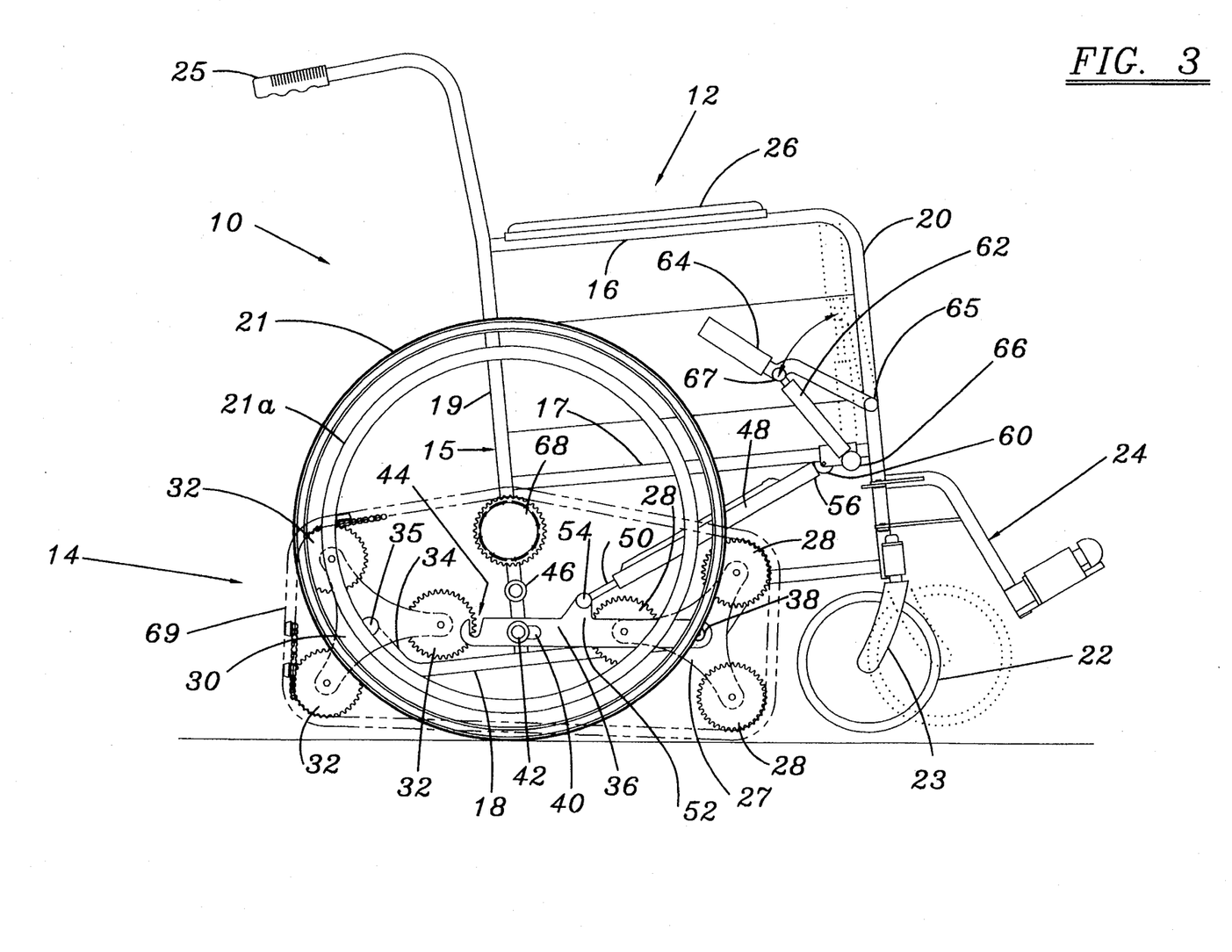
FIG. 3 is a right side elevational view of the wheelchair shown in FIGS. 1 and 2, with the climbing apparatus in the brake position.

Referring to FIGS. 1, 2, and 3, a wheelchair and stair-climbing assembly 10 is shown. The right side and the left side of the wheelchair have substantially identical parts, so that identical numerals will be utilized to refer to the parts of the right side and the left side.

The assembly 10 comprises a wheelchair 12 and a stair-climbing assembly 14. The wheelchair has a frame 15 formed on either side of upper horizontal frame members 16, intermediate horizontal frame members 17, and lower horizontal frame members 18. The frame members are connected to rear vertical frame members 19 and front vertical frame members 20.

Large wheels 21 having hand rails 21a are mounted on the rear vertical frame members 19. Small wheels 22 mounted in rotating swivels 23 are mounted at the ends of the front vertical frame members 20. Foot rest assemblies 24 are mounted on the front vertical frame members 20. Hand grips 25 are mounted at the ends of the rear vertical frame members 19, and arm rests 26 are mounted on the upper horizontal frame members 16.

The stair-climbing assembly 14 comprises, on both the right side and the left side, front spiders 27 having a plurality of arms. The preferred number is 3, although spiders having more than 3 arms may be utilized. Mounted on each arm of the front spiders 27 are front sprockets 28. Rear spiders 30 having a plurality of arms and rear sprockets 32 mounted one on each arm, are rotatably mounted at the ends 34 of the lower horizontal frame members 18 by means of a pivot pin 35. Guide arms 36 are pivotally attached to the front spiders 27 by means of pivot pins 38 in apertures 38a. The guide arms 36 are provided with lost motion slots 40 having pivot pins 42 therein connecting the guide arms 36 to the end of the rear vertical frame members 19. Guide arm recesses 44 are provided near the end of the guide arms 36 and are adapted to engage guide arm lock pins 46 when in the climbing condition. Guide arm actuating fluid, e.g., air, cylinders 48 have piston rods 50 which are connected to ears 52 provided on the guide arms 36 by means of pivot pins 54 in apertures 54a. The proximal ends 56 of the actuating fluid, e.g., air, cylinders 48 are mounted by means of pivot pins 60 to the frame members. A pump 62 has an actuating arm 64 which is pivotally connected at its end by a pivot 65 to the front vertical frame member 20. The pump 62 is connected to the frame by a pivot pin 66 and at its other end by a pivot pin 67 to the actuating arm. The pump 62 may be mounted on either the right side or the left side of the wheelchair frame. The fluid system, including cylinders 48, the pistons 86, the fluid pump 62, and the respective hoses, may be either air or hydraulic, as will be apparent to one skilled in the art, and will hereinafter be described as an air system, although other fluid systems are equally operative.

Chain drive sprockets 68 are mounted on each side coaxially with the large wheels 21 and are maintained in fixed relationship with respect to the wheels. Drive chains 69 are positioned on each side over the sprockets 28 and 32. A stairway 70 is shown to the rear of the wheelchair.

Figures 4, 5, 6, 7:
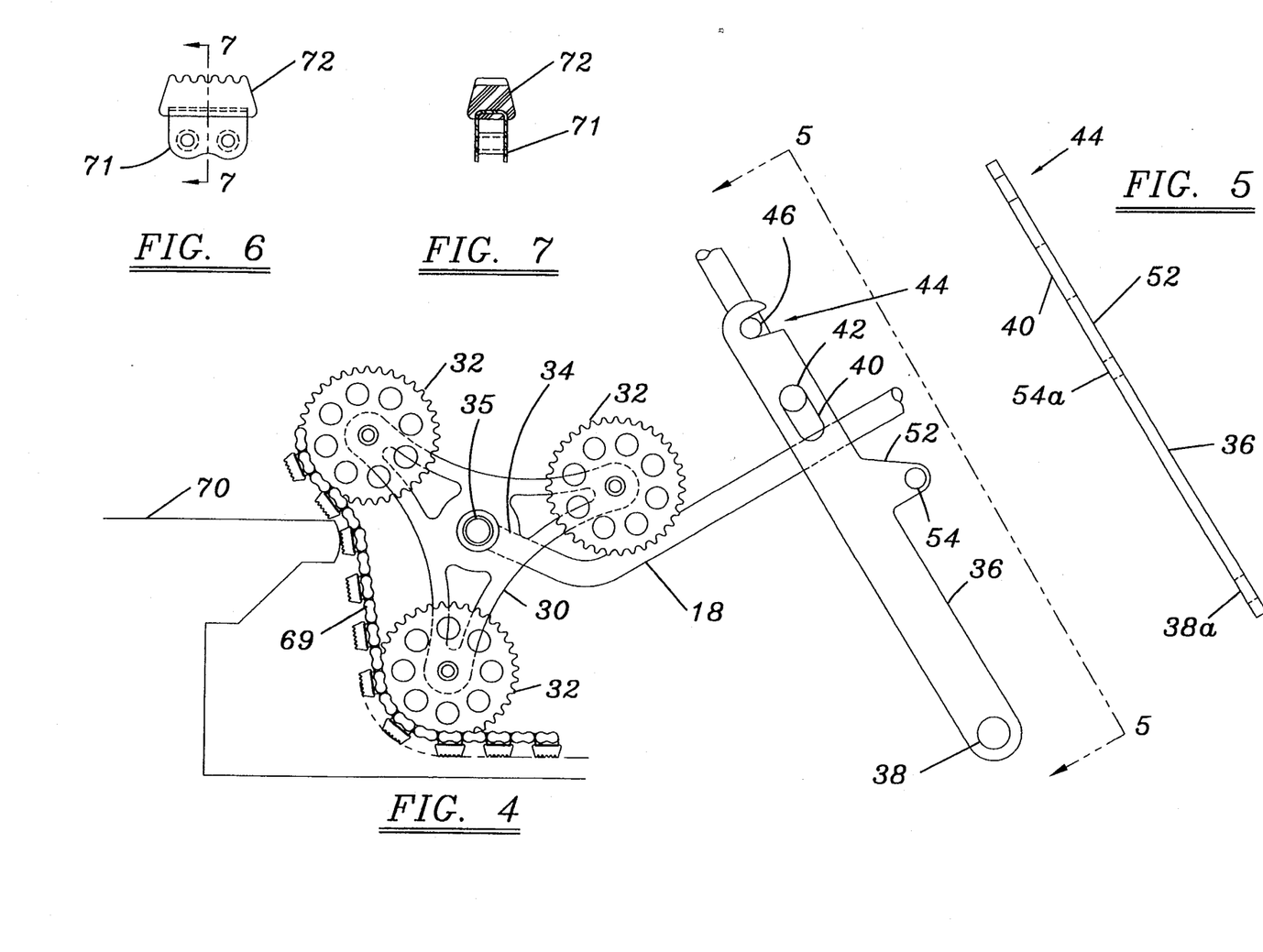
FIG. 4 is a fragmentary side elevational view of the rear spider, the rear sprockets, the chain, and the guide arm.
FIG. 5 is an edge view of the guide arm shown in FIG. 4.
FIG. 6 is an elevational view of one link of the chain shown in FIG. 4.
FIG. 7 is an end view of the chain link shown in FIG. 5.

Referring to FIGS. 4 and 5, the rear spider 30, its associated sprocket 32, the lower horizontal frame members 18, and the guide arm 36 are shown in greater detail.

Referring to FIGS. 6 and 7, a chain link 71 is shown having a pad 72 which may be of rubber or a plastic material suitable for gripping.

Figure 8:
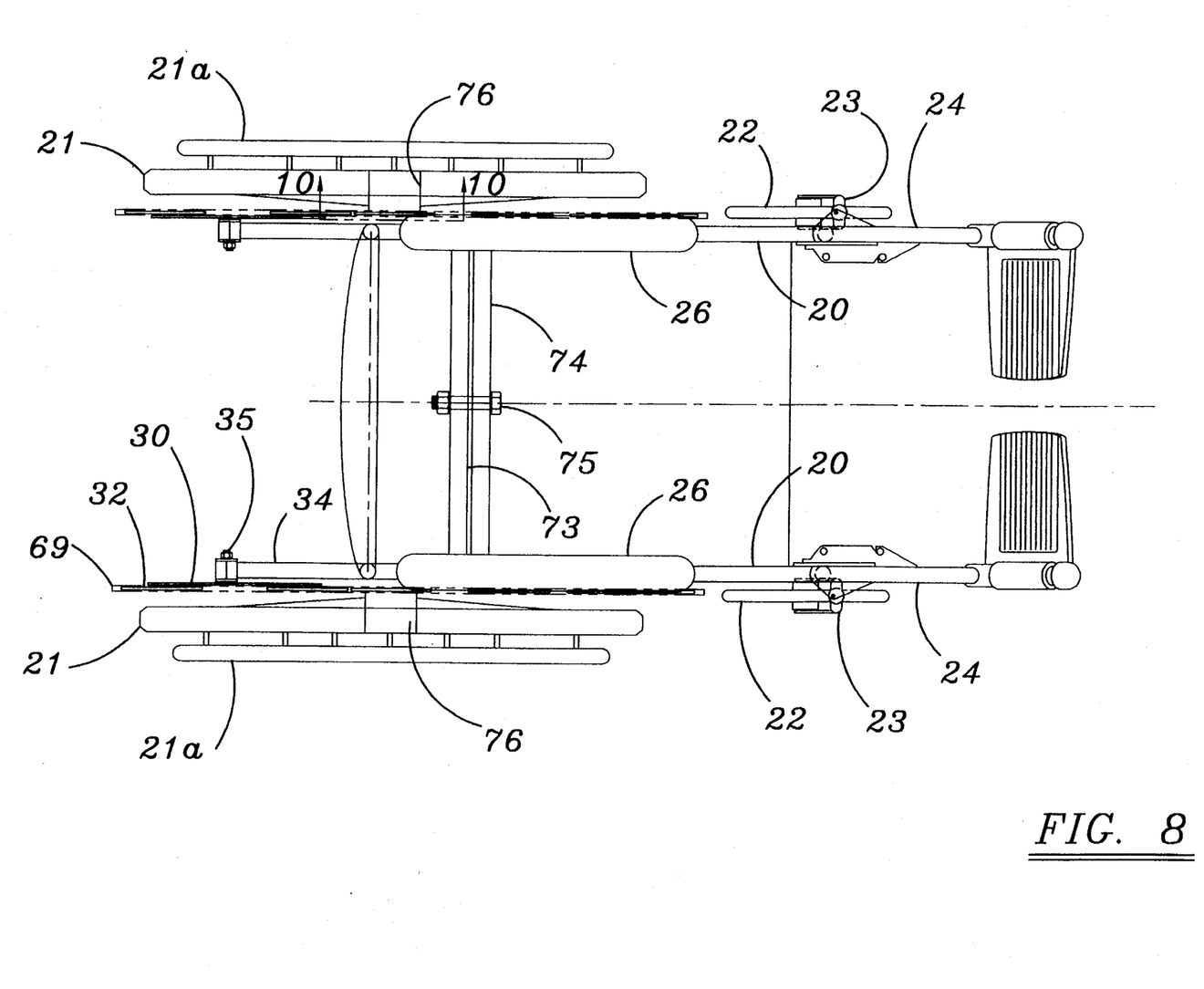
FIG. 8 is a top plan view of the wheelchair shown in FIGS. 1-3.

Referring to FIG. 8, a plan view of the wheelchair is shown illustrating the parts shown in FIGS. 1-3. Additionally, conventional right braces 73 and left braces 74 are shown maintaining the right side of the wheelchair and the left side of the wheelchair in operating position, and are affixed together by means of a bolt 75. In order to collapse and fold up the wheelchair, the bolt is loosened and the braces are folded out of position, permitting the right and the left side to be placed close together for transportation.

Figures 9, 10:
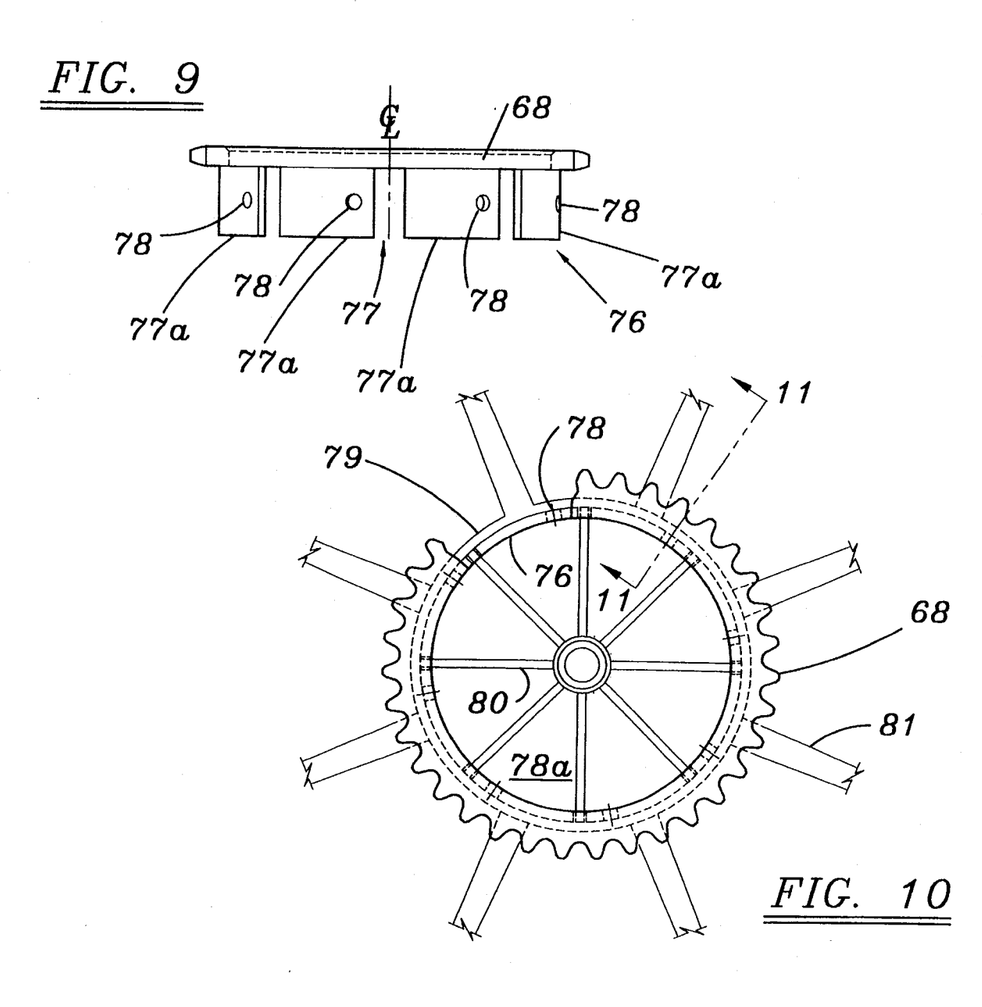
FIG. 9 is an edge view of the drive sprocket of the assembly showing the collar structure in detail.
FIG. 10 is a side elevational view of the drive sprocket shown in FIG. 9.
Figure 11:
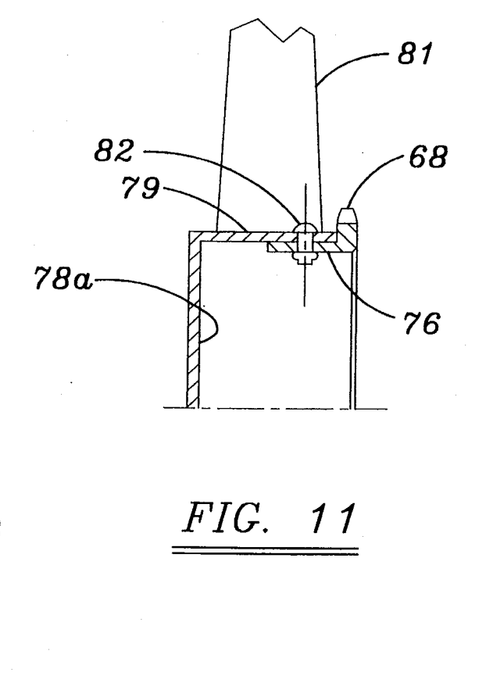
FIG. 11 is an enlarged fragmentary view taken at the line 11—11 of FIG. 10, showing the means for affixing the drive sprocket to the hub of the large wheels of the wheelchair.

Referring to FIGS. 9, 10, and 11, a drive sprocket 68 is shown having a collar 76 mounted thereon. The collar may be formed of any suitable material such as a plastic or metal. The collar 76 is provided with a plurality of slots 77 forming a plurality of segments 77a of the collar 76. The collar 76 as shown is adapted to be mounted on and placed in fixed relationship with respect to a very common form of large wheel utilized with conventional wheelchairs. This form of wheel has a hub 78a formed of a collar 79 having radial ribs 80 affixed therein. A plurality of spokes 81 radiate outwardly from the collar 79 of the hub 78a. The hub, collar, and spokes are usually molded of a plastic material. As shown in FIGS. 9, 10, and 11, the segments 77a of the collar 76 are positioned within the collar 79 of the hub 78a of the wheel. The radial ribs 80 of the hub are positioned within the slots 77 of the drive sprocket collar 76. In order to affix the structures together, apertures 78 are provided in the segments 77a of the collars 76 of the drive sprocket 68 and pop rivets 82 are inserted therein and through apertures driven into the collar 79 of the hub 78a, thereby maintaining the drive sprocket and large wheel in fixed relationship to each other. When wheelchairs are utilized having different types of large wheel structures, other means may be employed for affixing the drive sprocket to the large wheel, such as keying to the shaft, bolting the drive sprocket to the wheel frame, or any other suitable means.

Figures 12, 13:
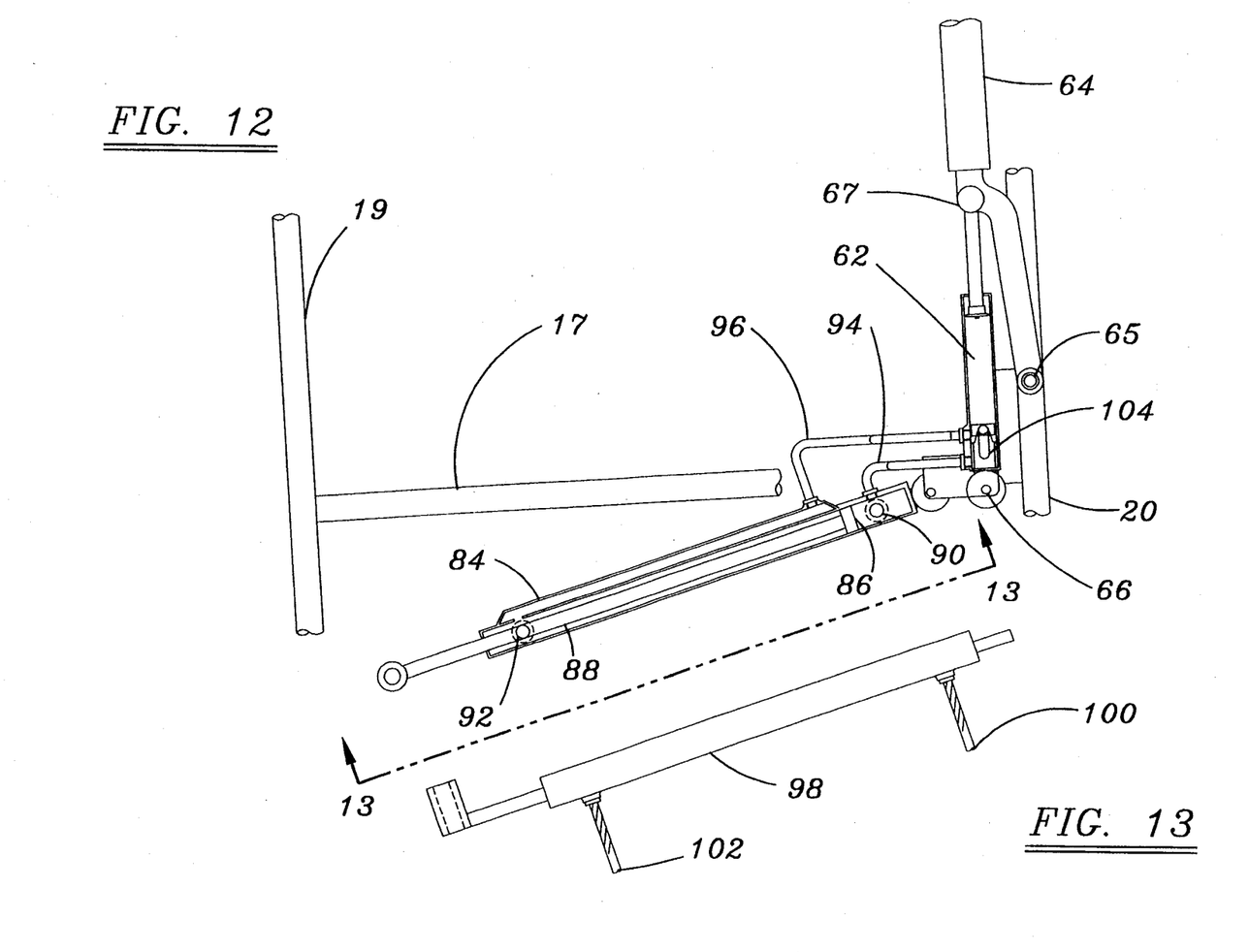
FIG. 12 is a side elevational view, partly in section, showing the hand pump assembly and the right actuating fluid, e.g., air, cylinder.
FIG. 13 is a side elevational view of the actuating fluid, e.g., air, cylinder mounted on the left side of the wheelchair.

Referring to FIGS. 12 & 13, a right side actuating air cylinder 84 and a left side actuating air cylinder 98 are shown, the cylinder 84 partly in section, having a piston 86 and a piston rod 88. The air cylinder 84 is the same as the air cylinder 48 shown in previous views. A duct 90 is provided for connection to the left cylinder to cause the piston thereof to extend, and a duct 92 is provided for connection to the left cylinder to cause the piston thereof to retract. A hose 94 connects the pump 62 to the right cylinder 84 for causing the piston 86 to extend. A hose 96 connects the pump to the right cylinder for causing the piston 86 to retract. In FIG. 13, the air cylinder 98 which is mounted on the left side of the wheelchair is shown, and has an air hose 100 connected to the duct 90 for causing the piston on the left cylinder to extend. An air hose 102 connects the left cylinder 98 to the duct 92 to cause the piston of the left cylinder 98 to retract. A switch 104 is provided to direct the air flow alternatively to the hose 94 and to the hose 96. The hose 94 connects the pump 62 to the right cylinder 84 and through the hose 100 for causing the pistons of both cylinders to extend. In the alternative position the switch 104 changes the air flow so that the air is directed to the hose 96 and the hose 102 for causing both the right piston 84 and the left piston 98 to retract.

Referring to FIG. 1, the wheelchair assembly is shown with the stair-climbing assembly 14 in the stowed away position. In this position the wheelchair behaves like a normal wheelchair. The occupant can move forward, backward, or turn right or left, as he desires, utilizing the hand rails 21a of the large wheels 21. The wheelchair can also be operated by an attendant who can push the chair, pull it rearwardly, or turn it in any direction.

Referring to FIG. 2, the wheelchair assembly 10 is shown with the stair-climbing assembly 14 in the climbing position. In order to attain this condition the switch 104 is turned to the position which causes the air flow through the hoses 94 and 100 to cause both pistons to extend. This is shown particularly in FIGS. 12 and 13. As the pistons on the right and left side move, they extend the guide arms 36 which pivot on the pivot pins 42, thereby lowering the front spiders 27 and their associated sprockets 28 until they reach the position shown in FIG. 2. At the end of this movement the guide arm recesses 44 lock into the guide arm lock pins 46. This movement additionally causes the wheelchair to recline through an acute angle, thereby stabilizing the entire assembly and the occupant, and permitting safe climbing up the stairs. In FIG. 2 the rear spiders and their sprockets 32 have reached the top of the first stair of the stairway 70. As the front spiders and their sprockets move downwardly, the drive chains 69 engage the chain drive sprockets 68. Then, as the occupant engages the hand rails 21a and rotates the large wheels 21 rearwardly, driving force is applied by means of the drive sprockets 68, thereby causing the drive chain 69 to rotate the sprockets and the spiders, and thereby to cause the wheelchair and its occupant to climb the stairway. Since the right side and left side portions of the stair-climbing assembly 14 are independent, the occupant, during the climbing of the stairs, can guide the directional movement of the wheelchair to the right or left in order to maintain a straight line, and may even turn the wheelchair 90 degrees on landings. The gear ratio between the drive sprocket 68 and the remainder of the stair-climbing assembly 14 is maintained sufficiently low so that the wheelchair can not descend the stairway on its own solely due to gravity, e.g., between about 4 and 6 to 1, preferably about 5 to 1. Consequently, at any point the occupant is safe in the wheelchair and has no danger of falling. In the condition shown in FIG. 2, the occupant of the wheelchair can also descend the stairway by rotating the large wheels forwardly until the entire descent has been completed in safety.

In order to return the stair-climbing assembly 14 to the normal condition shown in FIG. 1, the switch 104 is rotated to change the air flow to cause the pistons in the cylinders to retract. Once the switch 104 has been changed, the pump actuating arm 64 is once again moved forward and backward, causing the pump 62 to force air into the cylinders 84 and 98 through the hoses 96 and 102, thereby causing the pistons to retract to their original condition. As a result, the ends of the guide arms 36 together with the front spiders 27 and their sprockets are raised until they reach the stowed-away condition. In this condition, the wheelchair once again may be moved around by the occupant or by an attendant like any normal wheelchair.

Referring to FIG. 3, the wheelchair is shown in an intermediate condition or position in which the front spiders and their sprockets have been lowered so that the drive chain 69 remains in contact with the floor. In this condition the chain 69 serves as a braking force and prevents the wheelchair from moving under its own volition.

The wheelchair and stair-climbing assembly 10 of the present invention has many advantages over structures previously devised and disclosed in the art for enabling wheelchairs to climb stairways. First, the chair-climbing assembly 14 is relatively simple and may be readily attached to existing wheelchairs by welding, clamping or other suitable means. Second, the present wheelchair, even when the stair-climbing assembly has been mounted thereon and is in stowed away condition, can be used in the same manner as ordinary wheelchairs. It may be pushed, pulled, or turned by the occupant or an attendant. The two sides may be folded together for transportation in the same manner as ordinary wheelchairs. The chair-climbing assembly may be readily manufactured from commercially-available parts and at moderate cost. Primarily, the wheelchair and stair-climbing assembly of the present invention has the advantage that the entire process of climbing a stairway or descending a stairway may be accomplished solely by the muscular power of the occupant without the need for additional motivating sources such as electric motors or the manipulation by attendants.

Other plus features of the wheelchair of the invention are as follows:
  it has the advantage of being able to creep up steep ramps at a slower pace with less effort by the occupant.
  it can also be used on escalators by putting the wheelchair in "climb" position and then letting the escalator take the occupant up or down.

Although the preferred embodiments of the invention have been illustrated in the accompanying drawings and described in the foregoing Specification, it is to be understood that the invention is not limited to the exact embodiments disclosed or to the exact details of operation or exact methods or procedures shown and described, since the invention is capable of numerous modifications, rearrangements, and substitutions of parts and elements and other equivalents, without departing from the spirit or scope of the invention, as will readily be apparent to one skilled in the art, wherefore the present invention is to be understood as limited only by the full scope which can be legally accorded the appended claims.

I claim:

1. A wheelchair having apparatus affixed thereto for enabling said wheelchair to climb or descend a stairway solely under the guidance of and by means of the muscular power of an occupant, said wheelchair comprising:
  a wheelchair frame having large wheels rotatably mounted thereon, a hand rail mounted on each large wheel, and small wheels rotatably mounted in fork means which are mounted on said frame and rotatable about a vertical axis,
  said apparatus comprising on each side of said frame:
    a rear spider having a plurality of arms and a sprocket rotatably mounted on each arm, said spider being rotatably mounted on a rear portion of said frame,
    a guide arm pivotally mounted near a first end thereof on said wheelchair frame,
    a front spider rotatably mounted at the second end of said guide arm, said spider having a plurality of arms and a sprocket rotatably mounted at the end of each arm,
    a chain mounted over the sprockets of said front and rear spiders,
    means pivotally connected at one end to said frame and pivotally connected at the other end to said guide arm for extending said guide arm to a position wherein said front spider and its associated sprockets are moved to a climbing position, and alternatively for retracting said guide arm to a position wherein said front spider and its associated sprockets are in a stowed-away position, and
    a drive sprocket, mounted coaxially with and in fixed relationship to said large wheel, and adapted to engage said chain when said front spider and its associated sprockets are in a climbing position, and to become disengaged from said chain when said front spider and its associated sprockets are in a stowed-away position, whereby, when said front spider and its associated sprockets are in climbing position, said drive sprocket engages said chain and, when an occupant rotates said large wheels in a reverse direction, said wheelchair is caused to climb a stairway positioned at the rear thereof.

2. A wheelchair according to claim 1, wherein each of said spiders has three arms and a sprocket mounted at the end of each arm.

3. A wheelchair according to claim 1, wherein said means for extending or retracting said guide arm is a fluid-operated cylinder having a piston and piston rod adapted alternatively to extend and to retract, the proximal end of said cylinder being pivotally mounted on the frame of said wheelchair, and the distal end of said piston rod being pivotally connected to said guide arm, said cylinder having both proximal and distal fluid ports, a hand-operated fluid pump mounted on said wheelchair frame, and fluid hoses connecting said pump to said proximal and distal fluid ports for causing said piston alternatively to extend and to retract.

4. A wheelchair according to claim 3, having a switching valve adapted for alternatively directing fluid into the proximal ports of said cylinders for extending said pistons, or directing fluid to the distal ports of said cylinders for retracting said pistons.

5. A wheelchair according to claim 1, wherein said means for mounting said drive sprocket in fixed relationship with said large wheel is a collar affixed to said sprocket, said collar having notches provided at a free edge thereof defining a plurality of segments, said large wheel having a hub comprising a circular collar with radial ribs, the collar of said drive sprocket being positioned within the collar of said hub with said radial ribs being positioned in the notches of the collar of said drive sprocket, and the circular collar of the hub of said large wheel being affixed to the segments of the collar of said drive sprocket.

6. A wheelchair according to claim 5, wherein the circular collar of the hub of said large wheel is affixed to the segments of the collar of said drive sprocket by means of pop rivets extending through apertures provided in said segments.

7. A wheelchair according to claim 1, wherein said guide arm has a slot provided therein and is pivoted to said frame by a pivot mounted in said slot for providing lost motion.

8. A wheelchair according to claim 1, wherein said guide arm is provided at one end with a recess, and a lock pin is provided on the frame of said wheelchair, whereby when said guide arm is moved to the stair climbing position, said recess engages and is locked to said lock pin.

9. A wheelchair according to claim 1, wherein said chain has pads mounted on outer surfaces of chain links thereof to provide increased friction and minimize damage to the stairway.

10. A wheelchair according to claim 1, wherein extension of said guide arm to a position, wherein said front spider and its associated sprockets are in a climbing position, automatically places the rear spider and its associated sprockets into a climbing position.

11. A wheelchair according to claim 1, wherein at an intermediate position the front spiders and their sprockets are lowered so that the drive chain is in contact with a floor therebeneath, thereby serving as a braking force.

12. A wheelchair according to claim 3, wherein the fluid-operated cylinder is an air cylinder.

13. A wheelchair according to claim 4, wherein the fluid-operated cylinder is an air cylinder.

* * * * *